United States Patent [19]

Marks

[11] Patent Number: 5,233,639

[45] Date of Patent: Aug. 3, 1993

[54] STEREOSCOPIC FLUOROSCOPY APPARATUS AND METHOD OF PRODUCING STEREOSCOPIC X-RAY IMAGES

[76] Inventor: Lloyd A. Marks, 727 Great Springs Rd., Bryn Mawr, Pa. 19010

[21] Appl. No.: 619,434

[22] Filed: Nov. 29, 1990

[51] Int. Cl.⁵ .................... A61B 6/02; H05G 1/64
[52] U.S. Cl. .................... 378/42; 378/41; 378/99; 358/111
[58] Field of Search .......... 378/41, 42, 99, 62; 358/111; 359/253, 465, 56

[56] References Cited

U.S. PATENT DOCUMENTS

| | | | |
|---|---|---|---|
| 2,214,621 | 9/1940 | Leishman . | |
| 3,665,184 | 5/1972 | Schagen | 358/111 |
| 3,992,573 | 11/1976 | White | 358/190 |
| 4,039,829 | 8/1977 | Kato et al. | 358/92 |
| 4,149,082 | 4/1979 | Haendle et al. | 378/99 |
| 4,214,267 | 7/1980 | Roese et al. | 378/42 |
| 4,281,341 | 7/1981 | Byatt | 359/465 |
| 4,413,352 | 11/1983 | Nishio | 378/42 |
| 4,434,500 | 2/1984 | Lemke | 378/99 |
| 4,472,737 | 9/1984 | Iwasaki | 358/111 |
| 4,578,802 | 3/1986 | Itoh | 378/41 |
| 4,627,087 | 12/1986 | Marks | 378/4 |
| 4,654,699 | 3/1987 | Medina | 358/88 |
| 4,658,410 | 4/1987 | Haendle et al. | 378/99 |
| 4,696,022 | 9/19⁻ | Sashin et al. | 378/41 |
| 4,698,671 | 10/1987 | Garcia | 358/111 |
| 4,712,226 | 12/1987 | Horbaschek | 378/134 |
| 4,737,972 | 4/1988 | Schoolman | 378/99 |
| 4,761,803 | 8/1988 | Oppelt | 378/99 |
| 4,769,701 | 9/1988 | Sklebitz et al. | 378/99 |
| 4,792,850 | 12/1988 | Lipton et al. | 359/465 |
| 4,809,071 | 2/1989 | Yokouchi et al. | 358/111 |
| 4,819,255 | 4/1989 | Sato | 378/99 |
| 4,851,901 | 7/1989 | Iwasaki | 358/111 |
| 4,870,486 | 9/1989 | Nakaga Wa et al. | 359/56 |
| 4,877,307 | 10/1989 | Kalmanash | 359/465 |
| 4,884,876 | 12/1989 | Lipton et al. | 359/63 |
| 4,888,794 | 12/1989 | Haaker et al. | 378/99 |
| 4,901,336 | 2/1990 | Nishiki | 378/99 |
| 5,090,038 | 2/1992 | Asahina | 378/41 |

FOREIGN PATENT DOCUMENTS

| | | | |
|---|---|---|---|
| 56-155901 | 2/1981 | Japan . | |
| 0055843 | 4/1983 | Japan | 378/42 |
| 58-55843 | 4/1983 | Japan | 378/42 |
| 2084832 | 9/1981 | United Kingdom . | |

OTHER PUBLICATIONS

Takahashi et al., "Development of a new universal neuroangiographic unit" Neuroradiolosy, pp. 351–354 (1986).

Kundel et al., "Evaluation of Observer Performance Using Televised Stereofluoroscopy," Investigative Radiology, pp. 200–207 (May–Jun. 1967).

Roese et al., "Single Monitor Stereoradiological Television System Using PLZT Electrooptic Shutters," Radiology, pp. 743–744 (Dec. 1976).

Takahashi et al., "Abdominal Angiography with Stereoscopic Magnification," Cardiovasc Intervent Radiology, pp. 83–87 (1981).

(List continued on next page.)

Primary Examiner—Paul M. Dzierzynski
Assistant Examiner—Don Wong
Attorney, Agent, or Firm—Wigman, Cohen, Leitner & Myers

[57] ABSTRACT

A stereoscopic fluoroscopy apparatus comprising an X-ray source means, a specimen to be X-rayed, an image intensifier unit means to produce images of the X-rayed specimen, recording means to record and output said images as image pairs, offset means to create an output of different images forming each image pair, and means to direct said images to a viewer to create a stereoscopic image from said paired images.

22 Claims, 3 Drawing Sheets

OTHER PUBLICATIONS

"New X-Ray System Stereo Pictures," Hospital Management periodicial (Nov. 1966).
Lindblom, "Roentgen Television in Surgery with Special Reference to Stereo-Television," Acta Radiologica, pp. 367-369 (1960).
Takahashi, "Magnification Factor, Position, and True Size of an Object in Stereoscopic Magnification Radiography," Radiation Physics, pp. 215-217 (Jan. 1982).
Takahashi et al., "Stereoscopic Magnification Angiography Using a Twin Focal Spot X-Ray Tube," Radiology, pp. 791-792 (Mar. 1982).
Roese et al., "Stereoscopic Viewing with PLZT Ceramics," Ferroelectrics, pp. 47-51 (1976).
Potsaid, "Stereokineradiography, I. Perception of Motion and Depth," New England Journal of Medicine, pp. 1048-1057 (Nov. 1984).
Potsaid, "Stereokineradiology, II. Past Attempts, Current Designs and Proposed Solutions (Concluded)," New England Journal of Medicine, pp. 1151-1152 (Nov. 1964).
Zarnstorff et al., "Stereoscopic Fluoroscopy and Stereographic Cineangiocardiography," JAMA, pp. 1053-1056 (Jun. 1964).
"New Stereo fluoroscopy system reduces risk, time and discomfort," Canadian Hospital periodical (Oct. 1966).
Stauffer et al., "Stereoscopic Televised Fluoroscopy" (Jul. 1962).

STEREOSCOPIC FLUOROSCOPY APPARATUS AND METHOD OF PRODUCING STEREOSCOPIC X-RAY IMAGES

FIELD OF THE INVENTION

This invention related to a method and device for providing a three-dimensional stereoscopic image synthesized from a fluoroscopic image which has been obtained from an X-ray and image intensifier unit.

BACKGROUND OF THE INVENTION

Previously, light boxes have been used for the purpose of interpreting X-ray films. Typically, such boxes have a white pane of glass or plastic which is illuminated from the rear and which transmits light in a diffuse manner. The X-ray film is placed upon the front of the pane for interpretation. In many cases, however, interpretation is difficult with such light boxes, particularly when the X-ray images suffer from poor contrast or are very bright, as often arises when using the minimum possible level of radiation to protect the patient. It is not a simple matter for a medical practitioner to explain a finding or diagnosis to a patient by means of X-ray images because such pictures do not provide a three-dimensional perspective for viewing. The typical patient has difficulty visualizing body structures from two-dimensional pictures. Three-dimensional or stereoscopic viewing provides a means for showing actual, more understandable spatial relationships and is thus the preferred method for explaining medical findings to a patient.

Improved interpretation of X-rays has been made possible by several types of light box accessories. Some accessories, in the form of magnifying lenses, enlarge a section of the X-ray so that the patient may more clearly see the portion of the X-ray of most interest. Contrast filters have also been used for darkening bright X-ray films so that two-dimensional viewing is improved. Magnifying lenses, however, inevitably produce distortion of the X-ray image and detrimentally affect the contrast thereof, while so-called contrast filters, such as tinted glass panes, which are placed over the X-ray film, only result in general darkening of the picture without actually improving the contrast between bright and dark portions of the X-ray image. Thus, magnifying lenses and contrast filters have not been an adequate solution to the general problem of the difficulty that doctors and patients have in visualizing and understanding X-ray images.

Stereoscopy was first introduced to radiology near the turn of the century and many radiographs were taken stereoscopically. One early stereoscopic technique comprised the steps of placing a photographic plate behind the patient, exposing the plate with the X-ray apparatus, replacing the plate, shifting the X-ray apparatus laterally, and taking a second exposure. The films developed from the two exposures were then viewed in a stereoscopic viewer apparatus. The additional expense and exposure to X-rays, with the discovery that overexposure to X-rays is harmful, led to a rapid decline in this type of stereoscopic X-ray technique.

Certain improvements in stereoscopic techniques were later made to reduce patient exposure or overexposure to X-rays. One such improvement was to use intensifying and fluoroscopic screens which emit light when the phosphors thereof are excited by X-rays. The light emitted from these screens exposes an emulsion on a photographic plate. In fluoroscopy, the fluorescent screen is viewed directly. Patient exposure is reduced by fluoroscopy, however, other problems surfaced. For example, fluorescent screens were too dim for daylight (photopic) vision which is sharper than night (scotopic) vision. X-ray image intensifiers were developed which absorbed X-ray photons and converted their energy into light photons. The light photons struck a photocathode causing it to emit photoelectrons which were drawn away by the high potential of an accelerating anode. An electrostatic lens focused the electrons onto an output fluorescent screen which emitted light viewed by an observer. Image intensifiers were also often coupled with motion picture, television, or spot film cameras for recording output fluorescent images. Interpretation of X-rays was still difficult using these methods. One reason for this difficulty was that the three-dimensional images were static, i.e., not moving and thus did not provide as much information as a moving image.

Stereoscopic imaging has been an area of both great interest and frustration. Although many techniques have been used to achieve the stereo effect, all share the common principle that an image recorded from the perspective of the right eye must be presented to the right eye and an image recorded from the perspective of the left eye must be presented to the left eye.

The simplest way to accomplish this is to provide distinct and separate optical paths to each eye from each recorded image. This is the principle behind the common hand-held three-dimensional stereoscopic viewer in which right and left eye image pairs are recorded as transparencies. The transparencies are mounted so that when they are inserted in a viewer, the images comprising a pair are presented to each eye separately through magnifying lenses. Recently a stereo camcorder (Toshiba) has been developed which records sequences of right and left eye image pairs which are played back through two small CRT displays which are mounted on a band which the viewer wears about the forehead. The screens are positioned to provide the appropriate image to each eye. This results in moving three-dimensional images.

Another system which uses the principle of distinct and separate optical paths is the mirror based viewer. In this system, right and left eye image pairs (either opaque prints or transparencies illuminated from below) are positioned under a viewer which, through two pairs of angled mirrors, directs each image of the image pair to the appropriate eye. This type of system has been used extensively to view stereo X-rays and was the method used in this current study.

Any system which uses distinct and separate optical paths to each eye has some disadvantages. Only one viewer can see the image at a time and the viewer must maintain his head in a relatively fixed and narrow position. To overcome these problems, left and right eye images have been combined for display and are then extracted and passed to the appropriate eyes just before the light passes to the viewer. Some systems using this approach are more suitable for projected images; others are more suitable for images presented on a cathode ray tube (CRT) monitor.

The earliest method of this type was to tint the right and left eye images with complimentary colors, typically green and red, and then to combine them during display. The viewers wore a green filter over one eye and a red filter over the other eye. The red filter blocked the green images and vice versa. Thus, each eye received only one image. The two images are combined in the brain and the result is an essentially monochroma stereoscopic three-dimensional view. This type of system can also work with some success to decode stereo images on a CRT monitor and has been the basis for some three-dimensional television broadcasts.

A similar approach uses polarizing filters. Right and left eye image pairs are polarized with linear (horizontal/vertical) or circular (clockwise/counterclockwise) polarizing filters. The images are combined for viewing and they are viewed through matching filters which pass the appropriate image to each eye. This method of stereo viewing permits color images to be projected in three-dimensions. However, it cannot be used for images on a monitor screen as CRT phosphors cannot reproduce polarized light.

There have been two recent developments which permit multiple viewers to see stereoscopic views on a CRT screen. The first is a system based on the use of lead lanthanum zirconate titanate (PLZT) electrooptic ceramics. This material can be used to produce a nonmechanical electrooptic shutter which can be opened or closed in response to an electrical signal. A pair of such shutters can be configured as glasses. These glasses can be controlled, in synchrony with the images passed to the monitor screen, so that the shutter to the left eye is opened (and the shutter to the right eye is closed) when the left eye image is on the screen and vice versa. This permits more than one viewer to observe the stereo images. Until recently, these systems required a wire between the glasses and the controller. More recent advances permit this communication to be accomplished with a wireless system.

A PLZT viewer based system is effective, but, even in its wireless embodiment, is an "active" system which requires a relatively complex and expensive controller for each pair of glasses. A more recent system (Tektronix Corporation) may solve this problem. A liquid crystal based polarizing filter is positioned over the CRT screen. The filter can be electronically controlled to alternate between the clockwise and counterclockwise polarizing states. The system can be timed so that the left and right eye images are alternately presented on the monitor; left eye images are subject to clockwise circular polarization and right eye images to counterclockwise circular polarization. The viewer wears glasses in which the left eye looks through a clockwise polarizing filter and the right eye looks through a counterclockwise polarizing filter. This type of system offers the distinct advantage that the glasses are a passive device which is inherently simple and lightweight.

By rotating an X-ray imaging device about a subject (or a subject under an X-ray imaging device) images acquired from differing perspectives suitable for use as binocular image pairs can be obtained. The common static stereoscopic X-ray viewer used mirrors to present the left and right X-ray images to the left and right eyes respectively. Inherent disadvantages of this technique included the requirement for two exposures (and therefore twice the X-ray exposure), the limitation to one viewer at a time, and the ability to view only static images. Static stereoscopic films are not commonly used in the current era.

It was also found that two fluoroscopic tubes could not be positioned close enough together so that images could be taken at angles less than 35 degrees between the tubes. Otherwise, the tubes would collide with one another. It has been determined, moreover, that the angular focal spot separation, which correlates with the effective viewing angle between two images, must be no greater than about 5 degrees in order to obtain accurate stereoscopic viewing. Accordingly, the problem encountered in the art for the production of stereoscopic images was that a small angle (less than 5 degrees) between the positions at which the X-rays are taken was required for proper stereoscopic viewing. Optimal focal spot separation is a function of many factors including interpupillary distance, magnification factor, viewing distance, and focal spot to imaging plane distance. As these are all variable, it is desirable to be able to vary the focal spot separation. Current stereofluoroscopes use a dual focal spot source housed in a single X-ray tube and the spacing of the focal spots is fixed.

Dual focal spot stereo fluoroscopy systems overcome the limitation that two separate X-ray tubes cannot come close enough together. These systems permit motion to be recorded by generating and recording sequences of image pairs with a dual X-ray source. Such systems have been used principally for neuroradiology procedures. Early systems displayed these image pairs on two monitors and combined the images with a mirror based stereo image combining device (with its inherent disadvantages, as noted above). Later devices have combined the images with a PLZT electrooptic shutter system, allowing multiple users to see the images without being confined to the eye ports of a viewing device.

This clearly represented an improvement. However, the following disadvantages remain:

(1) Dual focal spot fluoroscopes are special purpose instruments which are not commonly available.

(2) These devices have a fixed distance between the two radiographic sources. As pointed out by Takashi et al. optimal focal spot separation (S) is a function of interpupillary distance ($S_V$), magnification factor (M), viewing distance ($D_V$), focal spot to film plane distance (D), and object size. Assuming that the object size is small compared to D and $D_V$, this relationship may be expressed as follows:

$$S = \frac{S_V}{M} \times \frac{D}{D_V}$$

Because these dimensions vary from study to study and from viewer to viewer, a compromise value for focal spot separation (on the order of 3 cm) has been used. Furthermore, depth perception is highly variable between individuals.

(3) A dual focal spot device has two X-ray sources and delivers double the radiation of a single source, i.e., a single focal spot X-ray device.

SUMMARY OF THE INVENTION

This invention resolves a number of problems associated with the aforementioned prior art stereoscopic X-ray methods and apparatus. The invention produces three-dimensional stereoscopic images which are synthesized from fluoroscopic images produced from an image intensifying unit such as is described above. A single X-ray and image intensifying unit is used along with recording, playback, and image combination apparatus to create stereoscopic views from a single pair or multiple pairs of different images. Since only a single X-ray device is used there is no problem with collisions between X-ray devices. In fact, angular focal spot separation of less than 5 degrees is easily obtainable between an image pair or image pairs and this angular separation is variable.

With this invention a patient is positioned between an X-ray source and an image intensifying unit mechanically connected by a C-arm to the X-ray source. Images are produced on the fluorescent screen of the image intensifier as the X-ray tube and image intensifier unit are rotated together by a motor or the like at a constant angular rate from a right anterior oblique position, i.e., patient's right-hand side, to left anterior oblique position relative to the patient or vice-versa.

A series of images may be obtained by the image intensifier unit from different viewing angles of the X-ray device as it is moved from a right oblique to a left oblique positions. The images acquired by the image intensifier unit at given time intervals may be separated by an equal or unequal angular displacement as is desired by the viewer. For example, the first image may be obtained at the initial setting of the X-ray device (e.g., at 0 degrees). The second image may be obtained when the X-ray device has moved 5 degrees. The third image may be obtained when the X-ray device has moved another 5 degrees. The fourth image may be obtained when the X-ray device has moved 3 degrees. The first two pairs of images (images 1 and 2. images 2 and 3) have an equal angular displacement of 5 degrees. The third pair of images (images 3 and 4) has an angular displacement of 3 degrees and thus does not have the same angular displacement as the other two pair of images. Each of these pair of images may still be combined with a stereoscopic viewing device to produce a three-dimensional image.

In one embodiment of the invention, this is accomplished by recording the initial sequence of images on two separate recording devices electrically connected to the image intensifier unit and playing back the images from each device with a fixed offset between the two images. In other words, even though each recording device records image 1 simultaneously, image 1 is not played back by recording device 1 simultaneously with the playback of image 1 recorded in recording device 2. In fact, image 1 of recording device 1 may be played back with image 4 of recording device 2. Thus, there is an offset between the playback of the images contained in the recording devices. If the offset between the two playback images is varied, the effective focal spot separation will be similarly varied. The magnitude of the separation angle is continuously variable, may be predetermined by the doctor or observer, and can be selected to achieve the small angular displacement of five degrees or less required for good stereoscopic viewing.

In the case of cardiac viewing, if the offset between the images is set equal to the time interval between two heartbeats, the cardiac motion between the combined images will be cancelled and will result in a sharp stereo image of the heart moving within the chest cavity. The R-R or peak-to-peak interval determined from successive QRS complexes can be used to automatically achieve optimal image separation.

The method of stereoscopic viewing may include image combination with a mirror based stereoscopic viewer. This method provides separate images to each eye from separate small cathode ray tube screens. Furthermore, the images may be combined on a single monitor using stereoscopic viewing glasses for viewing images which have been separated using color separation techniques or with switching shutters that alternate the images to each eye. A different type of playback unit is also another alternative wherein two or more playback heads produce displaced and different images from a single tape.

In addition, generation of derived stereo fluoroscopic images is obtainable with a single digital storage and playback device which provides both images of the image pair from its computerized memory.

In addition, generation of derived stereo fluoroscopic images is obtainable on a single storage/playback device which is connected to a second storage/playback device to derive a second view. "Live" moving stereo fluoroscopic images are also producible using real-time images from an imaging unit with an image storage device which contains previously stored real-time images. A stereoscopic effect is produced from the two images. Stereo images may also be created from stored data in a computer which is independent of the angular velocity of the imaging apparatus. Finally, stereo images are reproducible from cineangiograms using two playback units or two optical paths for projecting two images onto an apparatus for combining the images.

The principal objects of the present invention are to provide an improved fluoroscopic examination apparatus; to provide a stereoscopic fluoroscope apparatus for stereoscopic viewing of X-ray irradiated targets; to provide such an apparatus with one X-ray source and one image intensifier and a single or pair of playback units and monitors and video units; to provide such an apparatus wherein the images can be digitized and stored or computer enhanced and the enhanced signals displayed as images on a display unit; and to provide such an apparatus which is adaptable to industrial and security applications (such as viewing luggage at an airport security checkpoint) as well as medical uses; to provide such a stereoscopic fluoroscope apparatus which is economical to manufacture, precise in use and which is particularly well-adapted for its intended purpose.

Another object of this invention is to provide a series of paired or displaced images which can be retrieved from a computer memory and combined to form a sequence of stereoscopic images.

Another object of the invention is to provide a solution to the problem that the optimal focal spot separation of stereo fluoroscopy should be variable.

A still further object of the invention is to reduce the radiation exposure to the patient by the use of one single focal spot X-ray tube with a concommitant reduction in equipment cost.

Another object of the invention is to provide another solution to the problem of using two X-ray devices which collide when attempting to achieve a viewing angle between two images of less than 35°.

Other objects and advantages of this invention will become apparent from the following description taken in conjunction with the accompanying drawings wherein certain embodiments of the present invention are set forth by way of illustration and example.

DETAILED DESCRIPTION OF THE PREFERRED EMBODIMENTS

Figure 1:
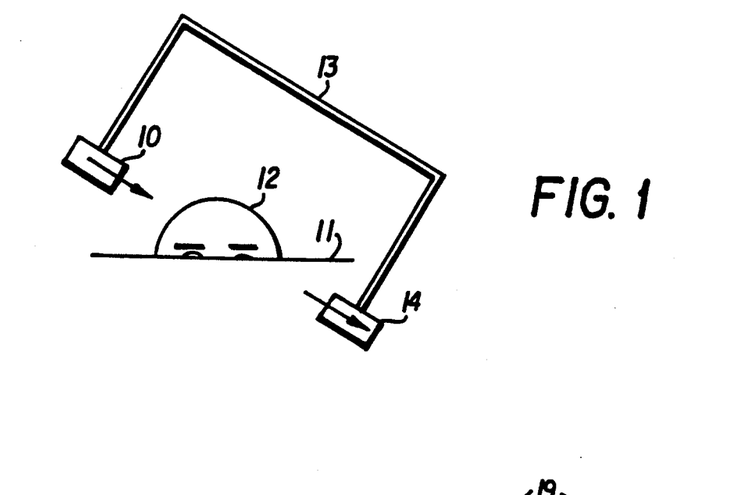
FIG. 1 is a schematic view illustrating a patient or other subject being subjected to a single focal spot X-ray source which is aligned in phase with an image intensifier unit according to the present invention.

Referring to the drawings in more detail, FIG. 1 shows a patient 12 lying prone on a table 11. A single focal spot X-ray source 10, shown on the left in the drawing but on the right hand side of the patient, is angularly positioned with respect to and focused upon the patient. X-rays emanate from the X-ray source 10 to the patient 12. The patient is positioned over a conventional image intensifier unit 14 already described above, which is mechanically connected to, and mounted on a C-arm 13 along with the X-ray source. By virtue of their mechanical connection and connection to a motor and energy source not shown, the image intensifier unit 14 is rotatable in phase with the X-ray source 10 about the patient 12. As used herein, the terminology "in phase" as used in connection with the rotation of the X-ray source and X-ray intensifier means that the X-ray source and X-ray intensifier rotate together at the same angular velocity and in the same direction about the patient. The rotation of X-ray device 10 and image intensifier unit 14 may be at a constant or variable angular rate as the physician or operator prescribes and depending upon which embodiment of the invention is used.

Images are continuously produced by the image intensifier unit 14 as it is rotated from a right anterior oblique position in FIG. 1, to the middle position, and finally to a left anterior oblique position. A series of images are thus produced from different viewing angles spanning from the a right lateral to a left lateral positions. If the X-ray tube is moved at a constant angular rate, acquired images recorded at given time intervals are separated by an equal number of frames and thus are separated by equal angular displacements. A plurality of image pairs, each separated by an equal number of frames, may be combined and viewed with a stereoscopic viewing device to produce stereoscopic images that move from the right to the left viewing positions.

Figure 3:
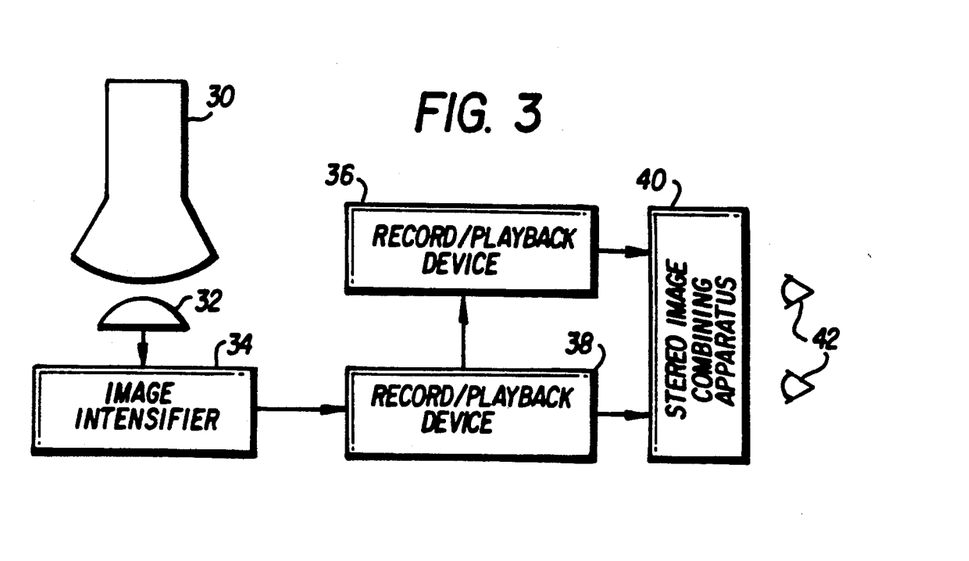
FIG. 3 is a functional block diagram of the present invention illustrating how a stereoscopic image is generated from images recorded on a single storage device.

One such stereoscopic viewing device is shown schematically in FIG. 3. The images produced by the image intensifier unit 14 of FIG. 1 are inputted, through electrical connection, to a pair of playback devices 30,33. The images are then played back with a fixed offset between the two playback units. Video monitors 16, 18, which may be television screens or cathode ray tubes (CRTs) are provided for viewing the playback images with an image combining device comprising mirrors 15, 17 which reflect the images of the two playback monitors 16, 18 to the eyes 19 of the viewer. The viewer sees two images as one stereoscopic image.

Figure 2:
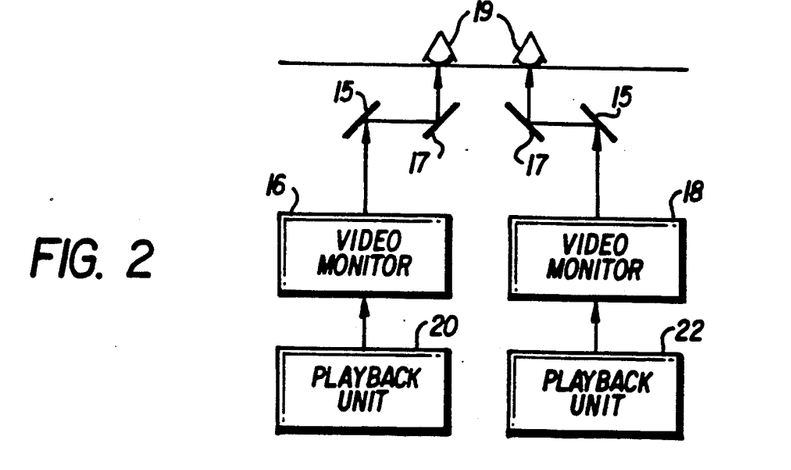
FIG. 2 is a schematic block diagram showing how a stereoscopic image is obtained by playback monitors from the images generated by the image intensifier.

The playback units 20, 22 may be Eigen Video Disk Recorders which contain an analog storage device. These recorders may receive an analog input from image intensifier unit 14 and may output an analog signal to a CRT video. The playback units 20, 22 may also be digital in nature and contain an analog to digital converter to convert the analog signal from the image intensifier unit 14 to a digital one for storage and ultimate transmission to a video device which may be digital or analog and, if the latter, a digital to analog converter may be required. The playback units 20,22 may also be one single digital playback unit which records the signals produced from the image intensifier unit 14. Digital angiography systems are particularly well suited for adaptation to produce derived stereo fluorograms. In such systems, multiple images are stored in the memory of a computer (as pixel arrays) where they can be accessed almost instantaneously. It would be rather straightforward to direct an appropriate image sequence to the monitor consisting of sequential left/right image pairs (e.g., images #1, #31, #2, #32, #3, #33, etc.) and to guide these images to the viewer's eyes with one of the stereo viewing systems described above. Furthermore, if the images are stored digitally, there can be some compensation for linear motion of the object by aligning two images comprising an image pair in much the same way that a mask can be registered with a contrast containing image in many digital subtraction anqiography systems. In some hospitals, a Siemens Digital Radiographic system is used. This system contains a BICOR section, which includes a fluorescent screen, a C-arm and X-ray device, for outputting an analog signal proportional to the image taken. This analog signal is digitized by an appropriate converter and transmitted to the DIGITRON section of the system which digitally records the images. The images are converted to analog signals and displayed by a television monitor which is electrically connected to the system.

The playback units 20, 22 of FIG. 2 may be connected to the image intensifier unit 14 shown in FIG. 1 to directly receive the image output therefrom. The magnitude of offset or separation between the playback devices 20, 22 may be fixed or made continuously variable, but regardless of which type of offset is used, the small displacement of 5 degrees or less between images required for good stereo viewing can be readily achieved. If the offset is set to equal the time interval between two heartbeats, cardiac motion between the combined images will be cancelled, and a sharp stereo image of the heart moving in the chest will be obtained. Optimal image separation can automatically be achieved under these conditions as noted above.

As stated earlier, the degree of offset between the playback devices 20, 22 may be constant or variable in other words, even though each of the playback devices records the same images from the image intensifier unit, the images played back by devices 20, 22 to the video monitors 16, 18 are not the same. In actuality, hundreds of images are produced by the image intensifier unit 14 as a result of scanning of the patient by the X-ray source 12. Assuming that images are produced at 0.1 degree increments in the rotation of the X-ray source 10 and image intensifier unit 14, the playback device 20 may record and play back images 1, 2, 3, 4, 5, et seq. taken at X-ray angular positions 0, 0.1, 0.2, 0.3, 0.4, et seq. degrees. Playback device 22, on the other hand, may start playing back images 31, 32, 33, 34 and 35 et seq. while playback device 20 is playing back images 1, 2, 3, 4, and 5 et seq. Based on this sequencing, the following pairs of images are transmitted to the playback video monitors 16, 18 (1, 31), (2, 32), (3, 33), (4, 34), and (5, 35) et seq. and hence to the viewer's eyes 19. In this case, the effective angular focal spot separation is 3 degrees for good stereoscopic viewing, and multiple stereoscopic images are produced. The effective focal spot separation and therefore the depth of the stereo effect can be varied by varying the offset between the images in each pair.

Referring now to FIG. 3, there is illustrated an X-ray source 30 which is positioned to take X-rays of a specimen 32; an image intensifier 34 is positioned in phase with the X-ray source to produce images of the specimen. Connected to the image intensifier 34 is a single record/playback device 38 which is similarly connected to a second record/playback device 36. The record/playback device 38 records and reproduces the images from image intensifier 34. Record/playback device 36 reproduces images from record/playback device 38, but the images from device 36 are produced at an offset or delay because the images must first be recorded and reproduced in record/playback device 38. Thus, there is generated from record/playback devices 36, 38 a series of paired but different images, due to the delay in reproduction, which are combined in the stereo image combining apparatus 40 to provide stereoscopic images viewed by viewer 42. The stereoscopic effect is created even if the images are recorded on a single recording device so long as the X-ray tube 30 is advanced around the subject at a constant angular rate. FIG. 3 thus shows an apparatus for generating stereo images from images recorded on a single storage device.

Figure 4:
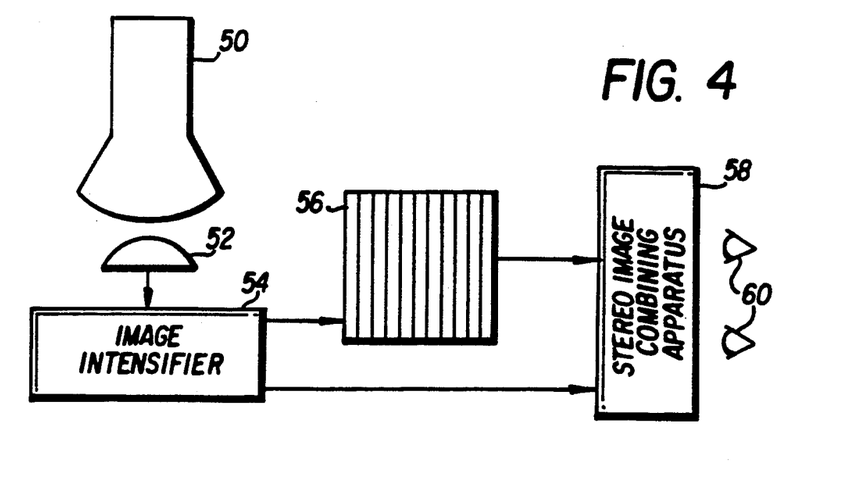
FIG. 4 is a functional block diagram showing how "live" motion stereoscopic fluoroscopy is obtained according to the present invention.

A "live" motion stereoscopic fluoroscopy device is illustrated in FIG. 4. In this embodiment, an X-ray source 50 is positioned to X-ray the subject 52, and an image intensifier unit 54 is illustrated in this embodiment as rotating in phase with the X-ray source. The image intensifier 54 provides a "live" image directly to a stereo image combining apparatus 58, which also receives an output from an image storage device 56 which functions to store images which have been previously taken. The prior images are sequentially stored. Thus, stereo image combining apparatus 58 receives a past image from image storing device 56 at an appropriate angular displacement from the "live" image output from image intensifier 54. The physician simply selects which past image should be combined with the live image to provide the desired stereo image. The X-ray tube shown in FIG. 4 is moved at a constant angular rate about the subject. The "live" image is first stored in the image storage device 56 until a sufficient angular displacement equal to a delay of a known number of images has been achieved. This apparatus causes a slight delay in the stereo effect in view of the need of the image storage device to store an appropriate number of sequential images. This delay will vary according to the angular velocity of the X-ray tube and the desired angular displacement of the images. Generally the delay should be in the order of 0.5 to 0.8 seconds.

In the above descriptions the images are obtained while moving the X-ray imaging device at a constant angular velocity around the subject. This assures that the sequential images are separated by an equal time interval equal to the reciprocal of the frame rate and by an equal angular displacement equal to the angular velocity divided by the frame rate. Thus, if the acquisition rate is 60 frames per second and the angular velocity is 6 degrees per second, each image is separated by 0.1 degree of arc and 1/60th second of time from the preceding and following images. Thus, image pairs with a fixed degree of angular displacement can be obtained by selecting images separated by a fixed number of frames.

Figure 5:
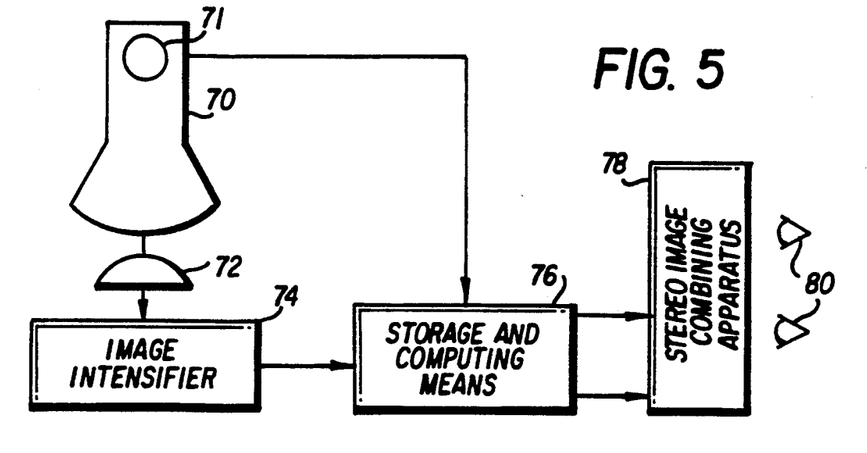
FIG. 5 is a functional block diagram illustrating a method of creating stereoscopic images from stored data independent of the angular velocity of the X-ray imaging apparatus.
Figure 6:
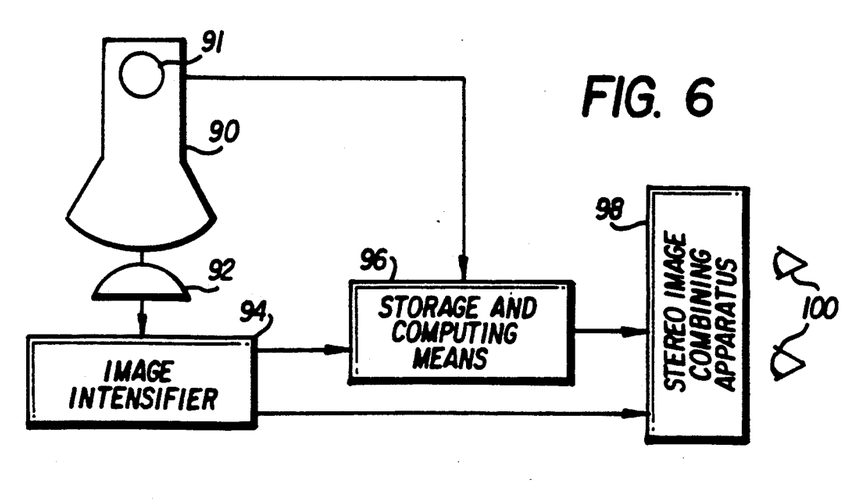
FIG. 6 is a functional block diagram illustrating a method of creating "live" stereoscopic fluoroscopic images obtained independently of the angular velocity of the X-ray imaging apparatus.

An alternate method, as shown in FIG. 5, is to provide a sensing means which provides a signal proportional to the angular position of the X-ray tube when the patient is irradiated and an image is produced. The angular position of the X-ray tube is recorded along with each image produced. Each image is identified with a known angular position. Image pairs can then be created by the playback device or devices based on a fixed angular displacement between two images comprising each pair. This type of system is immune to irregularities and a change in the angular velocity of the imaging apparatus. It will even accommodate coarse starting and stopping of the X-ray tube positioning mechanism without loss of the stereo effect. This type of system can be used for either stereo reproduction from recorded images, as shown in FIG. 5, or for creating live stereo images as illustrated in FIG. 6.

In FIG. 5 there is shown an X-ray source 70 positioned about a subject 72. The X-ray source 70 contains an imaging angle sensing means 71 whose output is sent to a storage and computing means 76. Below the subject 72 is an image intensifier 74 whose output also is delivered to the storage and computing means 76. The storage and computing means 76 records the various angular positions of the X-ray source and identifies each image associated with those angular positions. The storage and computing means 76 produces two image outputs to a stereo image combining apparatus 78. Image pairs are thus created based upon a fixed angular displacement between the two images comprising the pair. The eyes 80 of a viewer see the two images as one stereoscopic image independent of the angular velocity of the imaging apparatus.

"Live" stereo images may also be developed from the type of system shown in FIG. 5. For example, in FIG. 6, instead of the storage and computing means providing as an output two sets of images to the stereo image combining apparatus, the storage and computing means 96 outputs one set of images to stereo image combining apparatus 98. The second image received by combining apparatus 98 is "live" and is outputted from image intensifier 94 which is positioned below the subject 92. X-ray source 90 and image angle sensing means 91 are located above subject 92. Thus, the stereo image combining apparatus 98, much like the stereo image combining apparatus 58 in FIG. 4, is able to output a "live" stereo image which is independent of the angular velocity of the imaging apparatus. In FIG. 6 the viewer 100 is the person who sees the stereoscopic image from the two images input into the combining apparatus 98.

Stereo images can also be created from cineangiograms obtained by advancing the imaging unit (X-ray and camera) around the subject at a constant angular rate and then copying the images produced from the camera onto an electronic storage device such as a videotape, videodisk or digital buffer. Image pairs are created as described above in regard to FIGS. 3-6. This can also be accomplished by creating a duplicate copy of the cineangiogram and playing back the two copies with an appropriate offset between the two images through two different cineangiogram playback devices and combining the two offset images to create a stereoscopic image.

Figure 7:
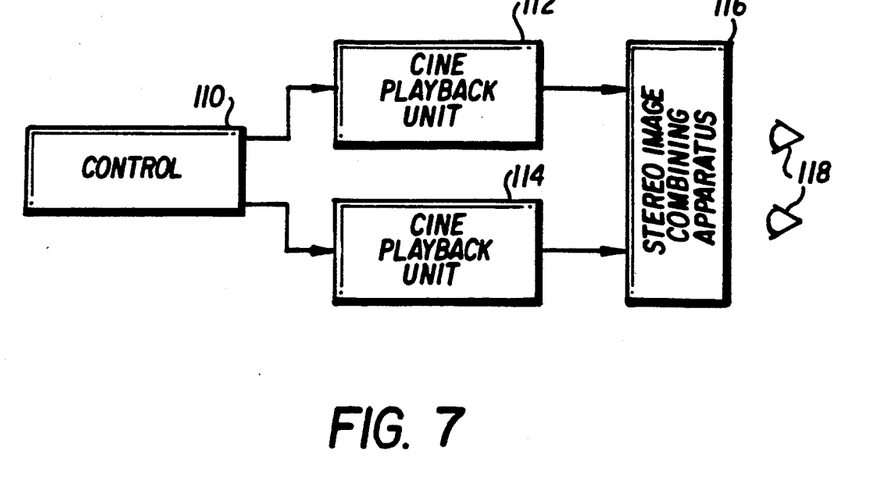
FIG. 7 is a functional block diagram of a method of creating stereoscopic images from cineangiograms.

FIG. 7 illustrates such a method of creating stereoscopic images from cineangiograms. Not shown in FIG. 7 is the X-ray source, patient and camera. The prints taken by the camera are transmitted to the cine playback units 112, 114. In FIG. 7 a control 110 provides a synchronization for the cine playback units 112, 114. Each of the playback units 113, 114 provides an output to a stereo image combining apparatus 116. A stereoscopic image is viewed by viewer 118 from the pair of images input to the combining apparatus 116. The output of one of the units 112, 114 is offset to create the required second image.

Figure 8:
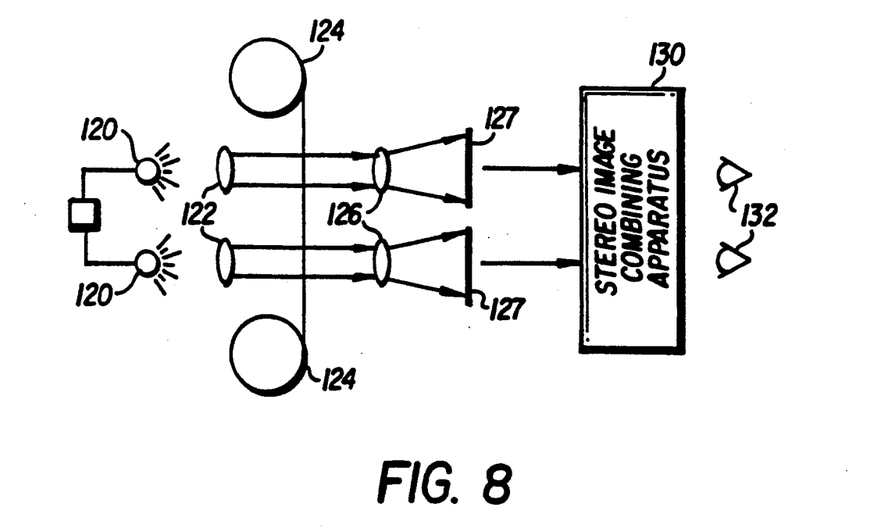
FIG. 8 is a schematic diagram of an alternative method of creating stereoscopic images from cineangiograms.

Another approach is to use a cineangiogram playback unit which incorporates two optical paths offset by a fixed number of frames to create two images which are combined to create a stereoscopic effect. FIG. 8 shows such an embodiment.

In FIG. 8 two optical paths 120 are contained in a cine playback unit such as 112, 114 shown in FIG. 7. The two optical paths illuminate the image through optical lens or filter devices 122, through the cine film 124, to other optical lens or filter devices 126 onto screens or mirrors 127 which contain the projected images 128. From the two screens or two mirrors, the projected images 128 are provided to stereo image combining apparatus 130 which provides the images to, and creates a stereoscopic image for, viewer 132.

In the image combining apparatus shown in FIGS. 1-8, the two images may be provided (1) with a mirror based image combining stereoscopic viewer as shown in FIG. 2, (2) by projecting the images on a screen with a different color bias for each image and then viewing the images with a different colored lens for each eye, (3) with an electro-optical shutter based glasses system which alternates images to each eye, (4) by any other means which selectively passes one of the two sets of images to the right eye and the other set of images to the left eye, or (5) by clockwise and counterclockwise polarized glasses and a liquid crystal-driven polarizer positioned between the screen and the viewer to accomplish (4) above.

It is to be understood that the above-disclosed embodiments are merely exemplary of the invention which may be embodied in various forms. Therefore, the specific structural and functional details disclosed herein are not to be interpreted as limiting, but merely as a basis for teaching one skilled in the art to variously employ the present invention in virtually any appropriately combined structure.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A stereoscopic X-ray apparatus comprising:
only one X-ray source;
an X-ray image intensifier;
means for rotating said one X-ray source and said X-ray image intensifier at an angular velocity about a specimen located in a line of sight between said X-ray source and said X-ray image intensifier;
means for operating said X-ray image intensifier as said X-ray source and X-ray image intensifier are rotated about the specimen to continuously produce a plurality of X-ray images, each image being taken at a different angular position while said X-ray source and said X-ray image intensifier are being rotated about the specimen;
means for stereoscopically viewing at least one pair of said X-ray images; and
storage means for storing a series of X-ray images, said stereoscopic viewing means comprising means for viewing one of said stored X-ray images and a real-time X-ray image produced by the X-ray image intensifier operating means to produce an apparent live stereoscopic image.

2. The apparatus of claim 1, wherein the stereoscopic viewing means comprises means for selectively transmitting one of said pair of X-ray images to the right eye of a viewer and the other of said pair of X-ray images to the left eye of a viewer.

3. The apparatus of claim 2, wherein said selective transmitting means comprises polarized glasses and a liquid crystal-driven polarizer.

4. The apparatus of claim 3, wherein said viewing means includes a cathode ray tube display, said liquid crystal-driven polarizer being positioned over said cathode ray tube display and being operative to alternate between polarization states so as to present left and right eye images to the viewer.

5. The apparatus of claim 4, wherein said polarized glasses are polarized in circular clockwise and counterclockwise directions.

6. The apparatus of claim 1, wherein said storage means comprises a digital storage device.

7. The apparatus of claim 1, wherein said storage means comprises an analog storage device.

8. A stereoscopic X-ray apparatus comprising:
only one X-ray source having only one focal spot;
an X-ray image intensifier;
means for rotating said one X-ray source and said X-ray image intensifier at an angular velocity about a specimen located in a line of sight between said X-ray source and said X-ray image intensifier;
means for operating said X-ray image intensifier as said X-ray source and said X-ray image intensifier are rotated about the specimen to continuously produce a plurality of X-ray images, each image being taken at a different angular position while said X-ray source and said X-ray image intensifier are being rotated in one direction about the specimen;
means for stereoscopically viewing at least one pair of said X-ray images, said stereoscopic viewing means comprising a cathode ray tube display, a liquid crystal polarizer positioned over said cathode ray tube display and being operative to alternate between polarization states and polarized glasses adapted to be worn by the viewer; and
storage means for storing a series of X-ray images, said stereoscopic viewing means comprising means for viewing one of said stored X-ray images and a real-time X-ray image produced by the X-ray image intensifier operating means to produce an apparent live stereoscopic image.

9. The apparatus of claim 8, wherein said X-ray source and said X-ray image intensifier are rotated together about the specimen at the same angular velocity.

10. The apparatus of claim 8, wherein said rotating means rotates said X-ray source and said X-ray image intensifier at a constant angular velocity.

11. The apparatus of claim 10, including means for selecting one or more pairs of X-ray images having a given time displacement therebetween for stereoscopic viewing.

12. The apparatus of claim 8, wherein said X-ray apparatus is a fluoroscopy apparatus.

13. The apparatus of claim 8 including:
   recording means connected to the X-ray image intensifier for recording the X-ray images produced by the X-ray image intensifier; and
   means connected to said recording means for selecting at least one pair of the recorded X-ray images for stereoscopic viewing.

14. The apparatus of claim 13, wherein said recording means includes a digital storage device.

15. The apparatus of claim 13, wherein said recording means comprises a first storage means for storing a first series of X-ray images and a second storage means for storing a second series of X-ray images, said selecting means being operative to select a first stored X-ray image from the first series of X-ray images and a second stored X-ray image from the second series of X-ray images for stereoscopic viewing.

16. The apparatus of claim 8, wherein said stereoscopic viewing means comprises means for stereoscopically viewing a plurality of pairs of said X-ray images, each pair of said X-ray images being taken at angular positions having an angular offset therebetween.

17. The apparatus of claim 16, wherein said angular offset between the X-ray images of each pair of X-ray images is constant.

18. The apparatus of claim 8, wherein said stereoscopic viewing means comprises means for sequentially and stereoscopically viewing a plurality of pairs of said X-ray images, each pair of said X-ray images being taken at angular positions having an angular offset therebetween.

19. The apparatus of claim 8, including means for sensing the angular positions of each of the X-ray images and means for selecting one or more pairs of X-ray images having a given angular displacement therebetween for stereoscopic viewing.

20. A method of producing a stereoscopic X-ray image comprising the steps of:
   providing only one X-ray source;
   providing an X-ray image intensifier;
   rotating said one X-ray source and said X-ray image intensifier at an angular velocity about a specimen located in a line of sight between said X-ray source and said X-ray image intensifier;
   operating said X-ray image intensifier as said X-ray source and said X-ray image intensifier are rotated about the specimen to continuously produce a plurality of X-ray images, each image being taken at a different angular position while said X-ray source and said X-ray image intensifier are rotated about the specimen;
   storing a series of X-ray images; and
   stereoscopically viewing one of said stored X-ray images and a real-time X-ray image produced by the X-ray image intensifier to produce an apparent live stereoscopic image.

21. The method of claim 20, wherein the step of stereoscopically viewing said stored and real-time images includes the steps of displaying such images on a cathode ray tube display, polarizing said display with a liquid crystal polarizer into alternating polarization states and viewing the polarized liquid crystal display with polarized glasses.

22. The method of claim 20, including the step of digitally storing said stored image.

* * * * *